(12) United States Patent
Lim

(10) Patent No.: US 7,706,783 B2
(45) Date of Patent: Apr. 27, 2010

(54) CHANNEL SWITCHING IN A MOBILE STATION

(75) Inventor: Chae-Jin Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 11/245,503

(22) Filed: Oct. 7, 2005

(65) Prior Publication Data

US 2006/0089132 A1    Apr. 27, 2006

(30) Foreign Application Priority Data

Oct. 8, 2004    (KR) ...................... 10-2004-0080556

(51) Int. Cl.
    *H04M 3/42*    (2006.01)
(52) U.S. Cl. ..................... 455/414.1; 455/466; 370/229
(58) Field of Classification Search ................ 455/414, 455/466, 414.1–414.4; 709/243; 370/229–235, 370/278, 395.71, 412–418
See application file for complete search history.

(56) References Cited

U.S. PATENT DOCUMENTS

| 6,088,803 | A * | 7/2000 | Tso et al. ..................... 709/203 |
| 6,631,412 | B1 | 10/2003 | Glasser et al. |
| 6,763,379 | B1 | 7/2004 | Shuster |
| 2001/0003828 | A1 * | 6/2001 | Peterson et al. ............. 709/219 |
| 2001/0030667 | A1 * | 10/2001 | Kelts ........................... 345/854 |
| 2001/0056578 | A1 * | 12/2001 | Hwang et al. .................. 725/98 |
| 2002/0173326 | A1 | 11/2002 | Rosen et al. |

FOREIGN PATENT DOCUMENTS

| JP | 2000244512 | 9/2000 |
| JP | 2001036637 | 2/2001 |
| JP | 2001184283 | 7/2001 |
| JP | 2001186250 | 7/2001 |
| JP | 2002261922 | 9/2002 |
| JP | 2003084888 | 3/2003 |
| JP | 2004228721 | 8/2004 |

* cited by examiner

*Primary Examiner*—Lester Kincaid
*Assistant Examiner*—Daniel Lai
(74) *Attorney, Agent, or Firm*—Lee, Hong, Degerman, Kang & Waimey

(57) ABSTRACT

A mobile station adapted for channel switching comprises an input unit adapted to receive user input associated with selection of content. The mobile station also comprises a timer generating unit operatively coupled to the input unit, adapted to generate a timer related to transmission of a command derived from the user input to a content server in response to the user input. The mobile station also comprises a transmitting unit operatively coupled to the input unit, adapted to transmit the command derived from the user input to the content server in response to expiration of the timer. The mobile station also comprises a receiving unit operatively coupled to the transmitting unit, adapted to receive the content from the content server in response to receipt of the command derived from the user input by the content server.

15 Claims, 3 Drawing Sheets

CHANNEL SWITCHING IN A MOBILE STATION

CROSS-REFERENCE TO RELATED APPLICATIONS

Pursuant to 35 U.S.C. §119(a), this application claims the benefit of earlier filing date and right of priority to Korean Application No. 2004-0080556, filed on Oct. 8, 2004, the contents of which are hereby incorporated by reference herein in their entirety.

FIELD OF THE INVENTION

The present invention relates generally to a mobile station and, more particularly, to channel switching in a mobile station.

BACKGROUND OF THE INVENTION

Mobile communication services provide functions such as wireless Internet access, VoD (Video on Demand) service, text and multimedia message transmissions, and on-line gaming.

The VoD service uses a media player to display packets transferred from a server using a streaming method. When a user accesses the VoD service, a server (e.g., content server) provides content (e.g., content packets) requested by the user, and the mobile station delivers the received content packets to the media player to display the content, in real time.

FIG. 1 is a flow diagram illustrating a VoD channel switching method, according to a related art.

Referring to FIG. 1, to receive a VoD service using the mobile station, the user connects to the content server using the mobile station. The content server transmits lists of content (e.g., channel lists) to the mobile station (S110). The mobile station arranges the channel lists and displays the channel lists on a display screen. The user selects desired content to receive from the channel lists (S112).

In the step S112, after the user selects the content, the mobile station drives a media player to connect to a Uniform Resource Locator (URL) of the selected content. Once the mobile station connects to the URL, the mobile station transmits a start command to the content server to allow the content server to transmit a content packet (e.g., a packet containing the selected content) (S114).

After the content server receives the start command through the URL, the content server transmits the selected content via the content packet(s) using a Real Time Streaming Protocol (RTSP) or a Real Time Protocol (RTP). The mobile station then displays the received content on a display screen, in real time (S116).

When the mobile station displays the selected content, if the user does not press a channel-switching key (e.g., channel up/down key and/or direction key), the content being currently displayed continues to be displayed (S120). After the selected content is completely displayed, the mobile station re-displays the channel lists on the display screen to enable the user to select other content (S120 and S122).

If the user wants to receive other content while the present content is being displayed and therefore presses the channel-switching key to select new content, the mobile station transmits a message to inform the content server to terminate transmission of the present content packet(s) (S124). Then, when a connection to the URL associated with the new content is obtained, the mobile station transmits a start command to the content server to allow the content server to transmit the packet associated with the new content (S114).

After receiving the respective transmission termination command and the transmission start command, the content server stops transmission of the present content packet(s), and starts transmission of the new content packet(s). The mobile station, in turn, receives the new content packet(s) and displays the new content on the display screen (S114 and S116).

However, the content server requires sufficient time to recognize and perform the commands transmitted from the mobile station. Thus, if the user frequently switches channel lists in less time than a command processing time, or, if the mobile station transmits plural commands, the content server may not have the required time for processing such commands. Therefore, many commands may be lost.

SUMMARY OF THE INVENTION

Accordingly, the present invention is directed to channel switching in a mobile station that substantially obviates one or more problems due to limitations and disadvantages of the related art.

An object of the present invention is to provide for channel switching in a mobile station by synchronization of the mobile station with a content server.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a mobile station adapted for channel switching comprises an input unit adapted to receive user input associated with selection of content. The mobile station also comprises a timer generating unit operatively coupled to the input unit, adapted to generate a timer related to transmission of a command derived from the user input to a content server in response to the user input. The mobile station also comprises a transmitting unit operatively coupled to the input unit, adapted to transmit the command derived from the user input to the content server in response to expiration of the timer. The mobile station also comprises a receiving unit operatively coupled to the transmitting unit, adapted to receive the content from the content server in response to receipt of the command derived from the user input by the content server.

The mobile station may further comprise a controller adapted to control the content received by the receiving unit in the mobile station. The mobile station may further comprise a display unit adapted to display the content received by the receiving unit in the mobile station. The mobile station may further comprise a program unit adapted to play the content received by the receiving unit in the mobile station. The mobile station may further comprise a memory unit adapted to store the content received by the receiving unit in the mobile station. The mobile station may further comprise a channel switching unit adapted to switch a channel for reception of the content by the receiving unit from the content server.

The timer generating unit may comprise a hardware-implemented clock. Time required for expiration of the timer may be based on a time required by the content server to process a command transmitted from the mobile station. The time required for expiration of the timer may be approximately 0.4 seconds, for example.

In another embodiment, a method for channel switching in a mobile station comprises receiving user input associated with selection of content, and generating a timer related to transmission of a command derived from the user input to a content server in response to the user input. The method also comprises transmitting the command derived from the user input to the content server in response to expiration of the timer, and receiving the content from the content server in response to receipt of the command derived from the user input by the content server.

The method may further comprise transmitting a content transmission start command to the content server in response to expiration of the timer. The method may further comprise controlling the content received from the content server in the mobile station. The method may further comprise displaying the content received from the content server in the mobile station. The method may further comprise playing the content received from the content server in the mobile station. The method may further comprise storing the content received from the content server in the mobile station. The method may further comprise switching a channel for reception of the content from the content server.

In yet another embodiment, a method for channel switching in a mobile station comprises receiving content from a content server, and displaying the content received from the content server. The method also comprises receiving user input to select different content while the content received from the content server is being displayed, and generating a timer to set a waiting period in response to the user input. The method also comprises transmitting a command derived from the user input to the content server after the waiting period, and receiving the different content from the content server in response to receipt of the command derived from the user input by the content server.

The method may further comprise transmitting a content transmission start command to the content server after the waiting period. The method may further comprise controlling the different content received from the content server in the mobile station. The method may further comprise displaying the different content received from the content server in the mobile station. The method may further comprise playing the different content received from the content server in the mobile station. The method may further comprise storing the different content received from the content server in the mobile station. The method may further comprise switching a channel for reception of the different content from the content server. The waiting period may be based on a time required by the content server to process a command transmitted from the mobile station.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In the present invention, a mobile station transmits commands to a content server at a set a time interval to allow the content server sufficient time for performance of the commands.

Figure 1:
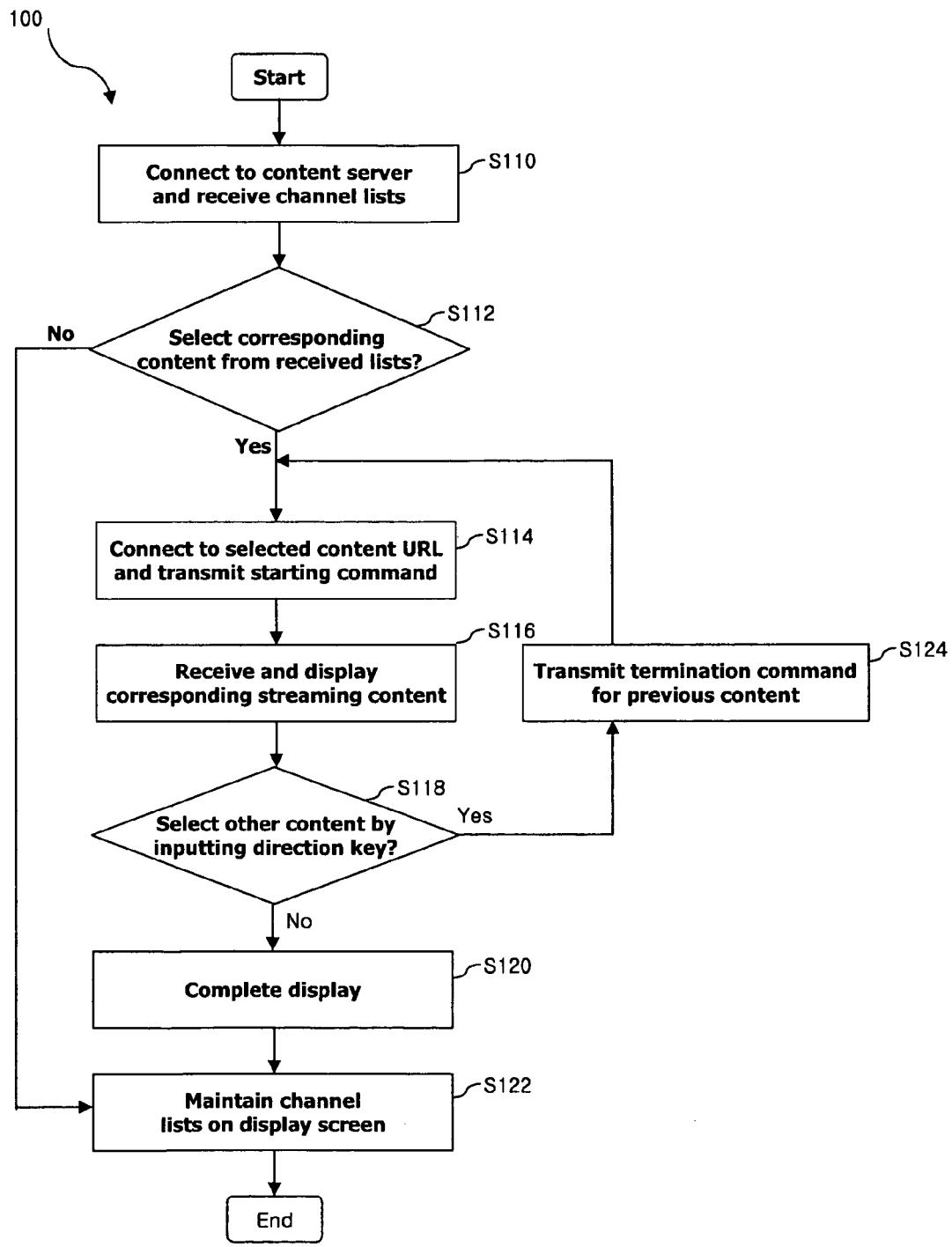
FIG. 1 is a flow diagram illustrating a VoD channel switching method, according to a related art.
Figure 2:
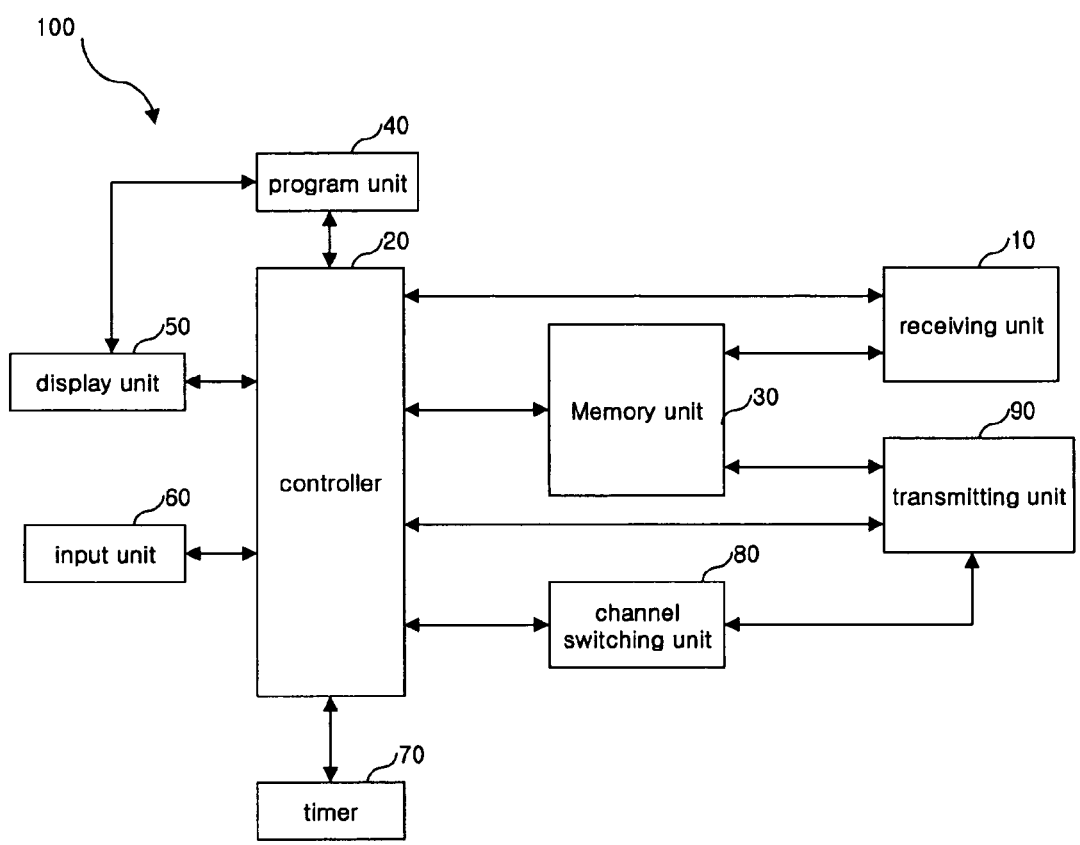
FIG. 2 is a block diagram illustrating a channel switching apparatus, according to an embodiment of the present invention.

FIG. 2 is a block diagram illustrating a channel switching apparatus 200, according to an embodiment of the present invention. The channel switching apparatus may be used for Video on Demand (VoD) services, for example, in a mobile station. Alternatively, the channel switching apparatus may be used for switching channels related to other types of services in a mobile station.

Referring to FIG. 2, the channel switching apparatus 200 includes a receiving unit 10 for receiving channel lists and/or content from a server (e.g., content server). The channel switching apparatus 200 also includes a controller 20 for controlling the received content and a memory unit 30 for storing the content received under the control of the controller 20. The channel switching apparatus 200 also includes a program unit 40 provided with a program for playing image-related content from among the received content. The channel switching apparatus 200 also includes a display unit 50 (e.g., display screen) for displaying the content from the memory unit and/or the program unit. The channel switching apparatus 200 also includes an input unit 60 for receiving a command for controlling the content to be displayed. The channel switching apparatus 200 also includes a timer generating unit 70 for generating a timer when a command is inputted. The channel switching apparatus 200 also includes a channel switching unit 80 for switching a channel. The channel switching apparatus 200 also includes a transmitting unit 90 for transmitting the content using the switched channel.

Operation of the channel switching apparatus 200 is described below with reference to FIG. 2. After the mobile station receives a content list (channel list) from the content server via the receiving unit 10 under control of the controller 20, the mobile station stores the channel lists in the memory unit 30 and displays the channel lists using the display unit 50. When content is selected from the displayed channel lists, the controller 20 drives a content player (e.g., media player) in the program unit 40 to connect to a URL of the corresponding selected content. The controller 20 also transmits a start command for transmitting a packet (e.g., content packet) associated the selected content to the content server via the transmitting unit 90 and then displays the content packet transmitted from the content server using the media player. The display of the content packet may be in real time, for example. The display of the content packet may include displaying images and/or information associated with the content packet.

When the content is being displayed, the user may select a channel switching key (e.g., channel up/down key and/or direction key) to input a channel switching command via the input unit 60 to select other content. In such case, the controller 20 transmits a stop message to inform the content server to stop transmission of the present content. The timer generating unit 70 generates a timer using, for example, a hardware-implemented clock, under control of the controller 20. After a set time reflected by the timer, the controller 20 transmits a channel switching command to the channel switching unit 80. The channel switching unit 80 then switches the channel according to the received channel switching command, and transmits the channel switching command to the transmitting unit 90. The transmitting unit 90 then notifies the content server that the channel has been switched. By waiting to transmit the channel switching command to the content server until after the set time, the content server may uniformly and sequentially perform received commands, such as 'start', 'stop', and 'vary content transmission'.

Figure 3:
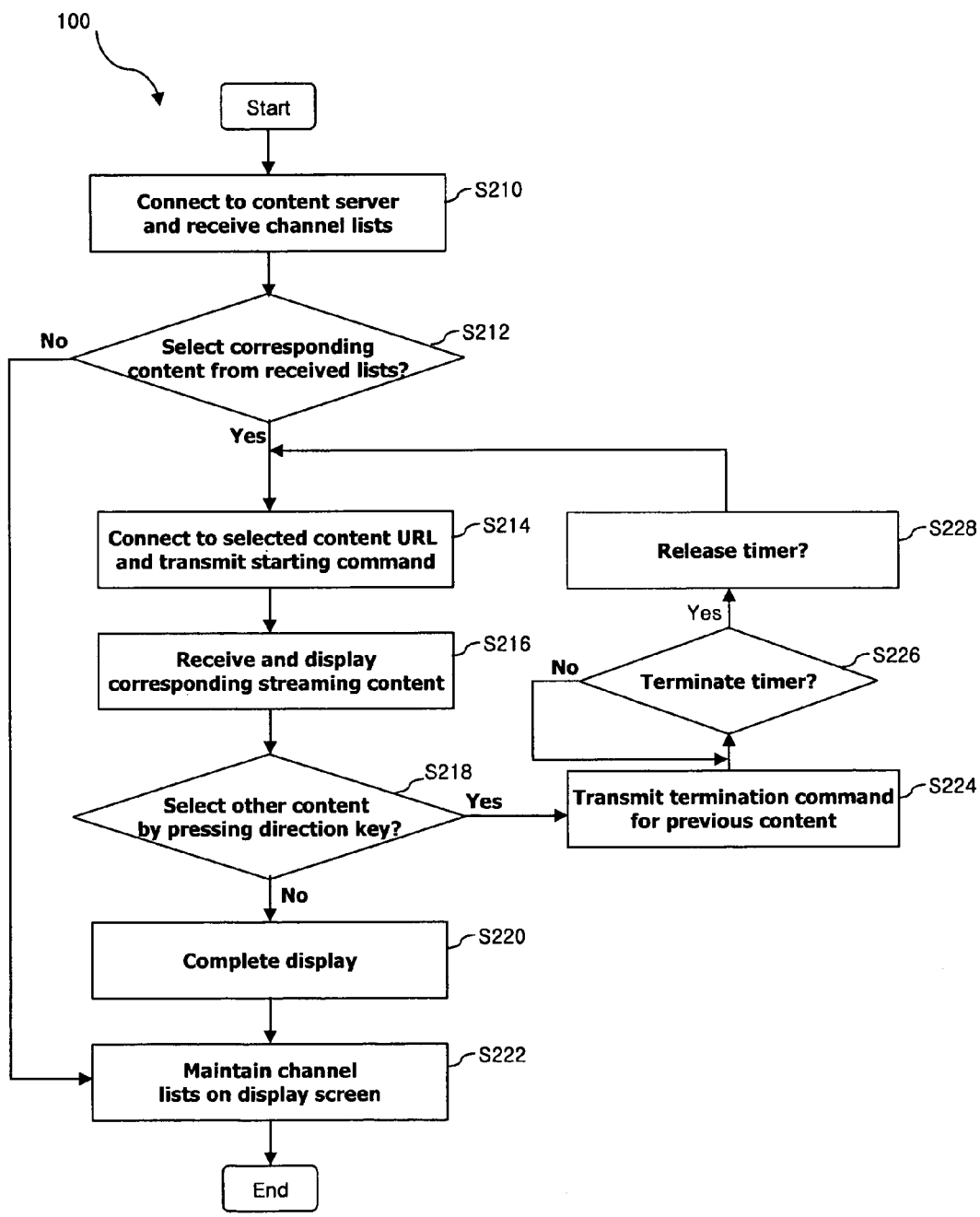
FIG. 3 is a flow diagram illustrating a channel switching method, according to an embodiment of the present invention.

FIG. 3 is a flow diagram illustrating a channel switching method, according to an embodiment of the present invention.

Referring to FIG. 3, to receive a VoD service using the mobile station, the user connects to the content server using the mobile station to receive channel lists (S210). The mobile station arranges the received channel lists to display each channel list on a display screen, and the user selects desired content from the channel lists (S212). Using the selected content, the mobile station drives the installed media player to connect to a URL corresponding to the selected content. The mobile station also transmits a start command to the content server to request transmission of a content packet associated with the selected content (S214). The content server receives the start command and transmits the content packet to the mobile station using, for example, a Real Time Streaming Protocol (RTSP) or a Real Time Protocol (RTP). The mobile station transfers the received packet to the media player to display the transferred content on the display screen, in real time (S216).

When the mobile station displays the content being received, if the user does not select other content by, for example, pressing a channel-switching key (e.g., channel up/down key and/or direction key), the present content continues to be displayed (S218 and S220). Once the selected content is completely displayed, the mobile station re-displays the channel lists transmitted from the content server to enable the user to select other content (S222).

However, if the user selects other content while the present content is being displayed, the mobile station transmits a message to inform the content server to terminate transmission of present the content. The mobile station also generates a timer using a hardware implemented clock (S218 and S224). The timer is released after a set time (e.g., 0.4 second) (S228). When the timer is released, the mobile station connects to a URL associated with the new content and transmits a start command to the content server to request packet transmission of the new content (S214). The content server receives the transmission start command and transmits the new content packet to the mobile station using a RTSP or a RTP. The mobile station then displays the new content packet using a media player (S216).

In one embodiment, a mobile station adapted for channel switching comprises an input unit adapted to receive user input associated with selection of content. The mobile station also comprises a timer generating unit operatively coupled to the input unit, adapted to generate a timer related to transmission of a command derived from the user input to a content server in response to the user input. The mobile station also comprises a transmitting unit operatively coupled to the input unit, adapted to transmit the command derived from the user input to the content server in response to expiration of the timer. The mobile station also comprises a receiving unit operatively coupled to the transmitting unit, adapted to receive the content from the content server in response to receipt of the command derived from the user input by the content server.

The mobile station may further comprise a controller adapted to control the content received by the receiving unit in the mobile station. The mobile station may further comprise a display unit adapted to display the content received by the receiving unit in the mobile station. The mobile station may further comprise a program unit adapted to play the content received by the receiving unit in the mobile station. The mobile station may further comprise a memory unit adapted to store the content received by the receiving unit in the mobile station. The mobile station may further comprise a channel switching unit adapted to switch a channel for reception of the content by the receiving unit from the content server.

The timer generating unit may comprise a hardware-implemented clock. Time required for expiration of the timer may be based on a time required by the content server to process a command transmitted from the mobile station. The time required for expiration of the timer may be approximately 0.4 seconds, for example.

In another embodiment, a method for channel switching in a mobile station comprises receiving user input associated with selection of content, and generating a timer related to transmission of a command derived from the user input to a content server in response to the user input. The method also comprises transmitting the command derived from the user input to the content server in response to expiration of the timer, and receiving the content from the content server in response to receipt of the command derived from the user input by the content server.

The method may further comprise transmitting a content transmission start command to the content server in response to expiration of the timer. The method may further comprise controlling the content received from the content server in the mobile station. The method may further comprise displaying the content received from the content server in the mobile station. The method may further comprise playing the content received from the content server in the mobile station. The method may further comprise storing the content received from the content server in the mobile station. The method may further comprise switching a channel for reception of the content from the content server.

In yet another embodiment, a method for channel switching in a mobile station comprises receiving content from a content server, and displaying the content received from the content server. The method also comprises receiving user input to select different content while the content received from the content server is being displayed, and generating a timer to set a waiting period in response to the user input. The method also comprises transmitting a command derived from the user input to the content server after the waiting period, and receiving the different content from the content server in response to receipt of the command derived from the user input by the content server.

The method may further comprise transmitting a content transmission start command to the content server after the waiting period. The method may further comprise controlling the different content received from the content server in the mobile station. The method may further comprise displaying the different content received from the content server in the mobile station. The method may further comprise playing the different content received from the content server in the mobile station. The method may further comprise storing the different content received from the content server in the mobile station. The method may further comprise switching a channel for reception of the different content from the content server. The waiting period may be based on a time required by the content server to process a command transmitted from the mobile station.

The present invention provides for channel-switching such that a mobile station waits a set time period before transmitting a start command associated with new content to a content server. By such waiting by the mobile station, a uniform time for sequential performance of commands, such as starting and/or stopping of content transmissions may be achieved. Furthermore, the present invention may prevent command from being lost without being processed by the content server by allowing the content server sufficient time to process the corresponding commands. Command synchronization may thus be achieved between the content server and the mobile station.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A mobile station adapted for channel switching, the mobile station comprising:
a receiving unit configured to receive a content channel from a content server;
an input unit operatively coupled to the receiving unit configured to receive a user content selection command;
a time delay generating unit operatively coupled to the input unit configured to generate a time delay wherein the time delay is based on a time required by the content server to process a command transmitted from the mobile station;
a transmitting unit operatively coupled to the receiving unit, the input unit, and the time delay generating unit configured to transmit the user content selection command to the content server,
wherein, when receiving a first content channel and upon receiving the user content selection command from the input unit, the transmitting unit transmits a stop message and, after the expiration of the time delay, further transmits the user content selection command to the content server, wherein the receiving unit receives another content channel responsive to the user content selection command.

2. The mobile station of claim 1, further comprising:
a controller for controlling the received content channel.

3. The mobile station of claim 1, further comprising:
a display unit for displaying the received content channel.

4. The mobile station of claim 1, further comprising:
a program unit for playing the received content channel.

5. The mobile station of claim 1, further comprising:
a memory unit for storing the received content channel.

6. The mobile station of claim 1, further comprising:
a channel switching unit for switching a content channel for reception of the content by the receiving unit from the content server.

7. The mobile station of claim 1, wherein the time delay generating unit comprises a hardware-implemented clock.

8. The mobile station of claim 1, wherein the time delay is approximately 0.4 seconds.

9. A method for channel switching in a mobile station, the method comprising:
receiving a user content selection command;
generating a time delay to delay transmission of the user content selection command to a content server;
transmitting a stop message when receiving a first content channel and upon receiving the user content selection and, after the expiration of the time delay, transmitting the user content selection command to the content server; and
receiving another content channel from the content server in response to the user content selection command,
wherein the time delay is based on a time required by the content server to process a command transmitted from the mobile station.

10. The method of claim 9, further comprising:
transmitting a content transmission start command to the content server in response after the time delay.

11. The method of claim 9, further comprising:
controlling the content channel received from the content server in the mobile station.

12. The method of claim 9, further comprising:
displaying the content channel received from the content server in the mobile station.

13. The method of claim 9, further comprising:
playing the content channel received from the content server in the mobile station.

14. The method of claim 9, further comprising:
storing the content channel received from the content server in the mobile station.

15. The method of claim 9, further comprising:
switching a channel for reception of the content channel from the content server.

* * * * *